US011619176B2

(12) United States Patent
Cerutti et al.

(10) Patent No.: US 11,619,176 B2
(45) Date of Patent: Apr. 4, 2023

(54) AIRCRAFT PROPULSION UNIT AND PROCESS FOR REDUCING A VENTILATION AIR FLOW IN THE AIRCRAFT PROPULSION UNIT

(71) Applicant: SAFRAN AIRCRAFT ENGINES, Paris (FR)

(72) Inventors: Eric Cerutti, Moissy-Cramayel (FR); Morgan Balland, Moissy-Cramayel (FR); Abdelkader Benyahia, Moissy-Cramayel (FR); Loïc Jeunesse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 16/422,044

(22) Filed: May 24, 2019

(65) Prior Publication Data

US 2020/0025107 A1    Jan. 23, 2020

(30) Foreign Application Priority Data

May 28, 2018    (FR) ...................................... 1854510

(51) Int. Cl.
*F02C 9/18* (2006.01)
*F02C 7/057* (2006.01)
*B64D 45/00* (2006.01)

(52) U.S. Cl.
CPC ................ *F02C 9/18* (2013.01); *F02C 7/057* (2013.01); *B64D 2045/009* (2013.01); *F05D 2220/323* (2013.01); *F05D 2270/09* (2013.01)

(58) Field of Classification Search
None
See application file for complete search history.

(56) References Cited

U.S. PATENT DOCUMENTS 3,990,530 A * 11/1976 Helfrich ................. B64D 33/06
181/215
4,351,394 A *  9/1982 Enk ......................... A62C 3/08
169/16

(Continued)

FOREIGN PATENT DOCUMENTS

FR    2879564 A1    6/2006
GB    2057574 A     4/1981

OTHER PUBLICATIONS

Rapport de Recherche Preliminaire dated Jan. 30, 2019, issued in corresponding French Application No. 1854510 filed May 28, 2018, 7 pages.

*Primary Examiner* — Todd E Manahan
*Assistant Examiner* — Rodolphe Andre Chabreyrie
(74) *Attorney, Agent, or Firm* — Christensen O'Connor Johnson Kindness PLLC

(57) ABSTRACT

An aircraft propulsion unit is described. The unit may include a gas generator with a fan surrounded by a casing. A nacelle may extend around the casing and define an annular compartment with the casing wherein some equipment may be housed. An air inlet may be configured so a ventilation air flow penetrates inside the compartment. An air outlet may be configured so a ventilation air flow is evacuated from the compartment. The propulsion unit may also include an air flow adjustment regulator. The air flow adjustment regulator may be configured to maintain a nominal value of the ventilation air flow circulating through at least one of the air inlet and of the air outlet under nominal operating conditions, and to reduce the value of this ventilation air flow when a fire is detected inside the compartment.

21 Claims, 2 Drawing Sheets

(56) References Cited

U.S. PATENT DOCUMENTS

| | | | |
|---|---|---|---|
| 4,441,314 A | | 4/1984 | Fitton |
| 5,239,817 A | * | 8/1993 | Mildenstein ............. F02C 7/25 |
| | | | 244/129.2 |
| 5,351,476 A | * | 10/1994 | Laborie .................... F02C 7/12 |
| | | | 60/785 |
| 7,093,666 B2 | * | 8/2006 | Trumper ................ B64D 25/00 |
| | | | 169/62 |
| 10,305,040 B2 | * | 5/2019 | Stoessel ................ H01L 51/005 |
| 10,450,956 B2 | * | 10/2019 | Schmitz .................... F02C 7/14 |
| 2005/0279103 A1 | * | 12/2005 | Bowers .................... F02C 7/04 |
| | | | 60/39.83 |
| 2007/0245711 A1 | * | 10/2007 | Stretton ................. F02C 7/185 |
| | | | 60/226.1 |
| 2009/0007570 A1 | * | 1/2009 | Ranganathan ............ F28D 9/00 |
| | | | 60/806 |
| 2009/0111370 A1 | * | 4/2009 | Porte .................... B64D 33/08 |
| | | | 454/76 |
| 2011/0120075 A1 | * | 5/2011 | Diaz ...................... F02K 1/383 |
| | | | 60/39.11 |
| 2015/0260101 A1 | * | 9/2015 | Teia Dos Santos Medes |
| | | | Gomes .................... F02C 7/18 |
| | | | 60/39.091 |
| 2016/0368618 A1 | * | 12/2016 | Charlemagne ............ F02C 7/12 |
| 2017/0283083 A1 | * | 10/2017 | Behbahani-Pour ....... A62C 3/08 |
| 2018/0016933 A1 | | 1/2018 | Elbibary et al. |
| 2018/0023841 A1 | * | 1/2018 | Berkompas ............. F24F 11/76 |
| | | | 454/258 |
| 2020/0240361 A1 | * | 7/2020 | Schacht .................... F02K 3/00 |

\* cited by examiner

AIRCRAFT PROPULSION UNIT AND PROCESS FOR REDUCING A VENTILATION AIR FLOW IN THE AIRCRAFT PROPULSION UNIT

TECHNICAL FIELD

Embodiments of the present disclosure relate to an aircraft propulsion unit, and to a process for reducing the ventilation air flow in a compartment of the aircraft propulsion unit.

BACKGROUND

The state of the art includes, in particular, documents U.S. Pat. No. 5,239,817, US-A1-2018/016933, U.S. Pat. No. 4,441,314, FR-A1-2 879 564 and GB-A-2 057 574.

Conventionally, a propulsion unit comprises a turbine engine surrounded by a nacelle. A turbine engine, in particular of a turbine engine for an aircraft, comprises a fan and a gas generator. The gas generator includes, from upstream to downstream in the direction of flow of the gases, at least one compressor, a combustion chamber and at least one turbine. The fan is generally located in a fan casing and a fan compartment is defined between the nacelle and the fan casing. The purpose of the fan is to generate a flow of air, of which a part supplies the gas generator and forms a primary flow, and a second part flows between the gas generator and the fan casing and forms a secondary air flow, which generates the greater part of the thrust of the turbine engine.

When a fire is detected in the compartment of the fan, a fire-extinguishing agent is injected in the compartment to extinguish the fire. The volume of the tanks of fire-extinguishing agent required to extinguish the fire, as well as the power of the fire, depend on the supply of oxygen to the fan compartment, and therefore on the ventilation air flow penetrating in the compartment.

In certain turbine engines, when the aircraft is in flight, the ventilation air comes from a passive scoop, such as a scoop with a constant and fixed passage section, located in the top part of the fan compartment. For example the scoop may be located between an air intake of the nacelle and the fan compartment. When the aircraft is in flight, the ventilation air is evacuated through a grid with fixed fins located in the low part of the fan compartment, for example between the fan compartment and the fan casing, to evacuate the ventilation air into the secondary air flow.

However, the size the scoop to determines the amount of ventilation air delivered to the fan compartment to adequately ventilate and cool the equipment installed in the compartment, and limits the air intake, and therefore the oxygen intake, in the event of a fire breaking out inside said compartment.

The present disclosure is proposes a simple, efficient and economical solution to these problems.

SUMMARY

For this purpose, the present disclosure relates to an aircraft propulsion unit comprising:
a gas generator comprising a fan surrounded by a casing, and
a nacelle extending around said casing and defining with the casing an annular compartment in which the equipment is housed,
air inlet arranged so that a ventilation air flow penetrates inside said compartment,
air outlet arranged so that a ventilation air flow is evacuated from said compartment, and
air flow adjustment regulator, configured to maintain a nominal value of the ventilation air flow circulating through at least one of said air inlet and of said air outlet under nominal operating conditions, and to reduce the value of this ventilation air flow when a fire is detected inside said compartment.

In some embodiments, reducing the ventilation air flow when a fire occurs inside the compartment reduces the weight of the fire-extinguishing agent, and the volume of its container, provisioned and installed on-board the aircraft. In some embodiments, reducing the ventilation air reduces the oxygen supply inside the compartment. Furthermore, the power of the fire is limited when the engine is shut off. In some instances, there can be a ten-minute delay between the moment the engine is shut off and the moment the fire is extinguished. During these ten minutes, the engine is shut off and the air coming into the engine is no longer compressed. The ventilation air supply of the compartment is thereby limited to a few grams per second of leaks, instead of hundreds of grams per second under nominal operating conditions. The power of the fire is therefore reduced, which improves the sturdiness and enables significant weight and cost savings when sizing the compartment.

In some embodiments, the reduction of the ventilation flow in the event of a fire in the compartment avoids having to limit the sizing of the scoop in terms of the supply of cooling air to the equipment under nominal operating conditions. In some instances, with an increased ventilation air flow, the cooling of the equipment inside the compartment is optimized. Consequently, the maximum temperatures of this equipment under nominal operating conditions are reduced, which may extend the lifespan and enables using materials with lower resistance to fire, which may be lighter and less expensive.

The air inlet means (air inlet) may comprise an air inlet pipe. In some embodiments, the flow adjustment means are configured to reduce the passage section of the air inlet of said pipe.

The flow adjustment means may comprise a flow-control valve. For example, the flow adjustment means can comprise a butterfly valve.

The flow adjustment means may comprise a fusible link valve.

In some embodiments, the flow adjustment means comprising a fusible link valve may be simplified and lighter, as a fusible link valve does not comprise a mechanism for reopening the air inlet means.

According to one embodiment, the flow adjustment means may be configured to reduce the passage section of the air inlet of the pipe when the control means connected to the flow adjustment means are actuated by an aircraft pilot.

The propulsion unit may include a temperature sensor configured to measure the temperature in the compartment.

According to another embodiment, the flow adjustment means may be configured to reduce the passage section of the air inlet of the pipe when the temperature measured by the temperature sensor is equal or superior to a given temperature.

According to another embodiment, the flow adjustment means may be configured to reduce the passage section of the air inlet of the pipe when a regulation system is activated, the regulation system being configured to be activated when a fire is detected in the compartment. The regulation system may be further configured to actuate the fuel flow regulation means.

In some embodiments, the regulation system enables both actuating the fuel flow regulation means (fuel flow regulator) and reducing the passage section of the air inlet of the pipe. Therefore, by reusing the regulation system to reduce the passage section of the air inlet of the pipe, the installation of an additional device in the propulsion unit can be avoided.

The air outlet means (air outlet) may include an air outlet grid provided with fins. In this embodiment, the air flow adjustment means (air flow adjustment regulator) are configured to reduce the section of the air outlet passages through the air outlet grid.

According to one embodiment, the fins are made of a thermoplastic material. Thus, the fins are configured to expand to reduce the section of the air outlet passages through the air outlet grid.

In an alternative embodiment, the fins comprise an external coating made of an intumescent material. Thus, the fins are configured to swell to reduce the section of the air outlet passages through the air outlet grid.

The present disclosure also relates to an aircraft comprising at least one propulsion unit according to the present disclosure.

The present disclosure also relates to a process for reducing a ventilation air flow of a compartment of an aircraft propulsion unit, by means of a propulsion unit according to the present disclosure.

The process comprises a step of adjusting the value of the ventilation air flow circulating through at least one of the air inlet means and of the air outlet means to reduce the value of this ventilation air flow when a fire is detected inside said compartment.

The step of adjusting the value of the ventilation air flow may comprise a sub-step consisting of reducing the air inlet passage section of an air inlet pipe of the air inlet means.

According to one embodiment, prior to the sub-step of reducing the air inlet passage section, the process may comprise a step whereby the aircraft pilot actuates control means connected to the flow adjustment means.

Prior to the sub-step of reducing the air inlet passage section, the process may comprise a step whereby the temperature inside the compartment is measured, and a step whereby the measured temperature is compared with a given temperature.

According to another embodiment, the step of adjusting the value of the ventilation air flow may comprise a sub-step consisting of reducing the air inlet passage section of an air inlet pipe of the air inlet means when the measured temperature is equal or superior to the given temperature.

The step of adjusting the value of the ventilation air flow may comprise a sub-step consisting of reducing the air outlet passages section through an air outlet grid with fins of the air outlet means.

The fins may comprise a thermoplastic material. In this embodiment, the sub-step of reducing the section of the air outlet passages may comprise the expansion of the fins to reduce the section of the air outlet passages through the air outlet grid.

The fins may comprise an external coating made of an intumescent material. In this embodiment, the sub-step of reducing the section of the air outlet passages may comprise the swelling of the external coating of the fins to reduce the section of the air outlet passages through the air outlet grid.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
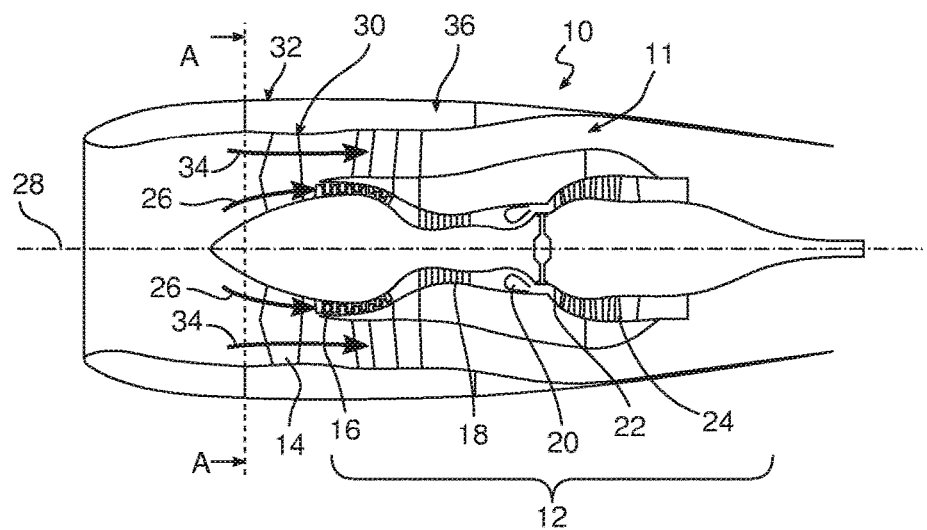
FIG. 1 is a schematic cross-section view of an aircraft propulsion unit according to the present disclosure.

FIG. 1 shows an aircraft propulsion unit 10 comprising a turbine engine 11 surrounded by a nacelle 32.

The turbine engine 11 may be a turbojet, which comprises a fan 14 and a gas generator 12. The turbine engine 11 may be a twin-body bypass turbine engine, as shown in FIG. 1. The gas generator 12 comprises, from upstream to downstream in the direction of flow of the gases, at least one compressor, in this case a low pressure compressor 16 and a high pressure compressor 18, a combustion chamber 20 and at least one turbine, such as a high pressure turbine 22 and a low pressure turbine 24. The gas generator 12 defines a flow path for a primary gas flow, shown by arrow 26.

The rotor of the high pressure turbine 22 is secured to the rotor of the high pressure compressor 18 to form a high pressure body, whereas the rotor of the low pressure turbine 24 is secured to the rotor of the low pressure compressor 16 to form a low pressure body. The rotor of each turbine rotationally drives the rotor of the associated compressor about an axis 28 under the effect of the thrust of gases coming from the combustion chamber 20.

The nacelle 32 extends around the turbine engine 11 and defines around the latter an annular flow path for a secondary air flow, shown by the arrow 34. In some embodiments, the air flow circulates through the fan 14 and is subsequently divided to form the primary air flow 26 and secondary air flow 34.

The fan 14 is surrounded by a casing 30 of the fan. The nacelle 32 extends around the fan casing 30. The nacelle 32 and the casing 30 of the fan 14 define an annular compartment 36, called fan compartment. The compartment 36 is located radially between the casing 30 of the fan 14 and a hood of the nacelle 32 of the turbine engine 11.

Equipment may be housed in the compartment 36. This equipment may include accessory cases suspended by flanges formed on the casing 30 of the fan or on the nacelle 32. For example, the equipment may include an oil tank, an oil pump, a fuel pump, a fuel monitoring unit (FMU), a hydraulic pump, one or several electronic engine controller (EECs), one or several ventilators, a starter, a starter air valve, an integrated drive generator (IDG), a main fuel filter (MFF), a permanent magnet alternator (PMA), a servo fuel heater (SFH), an fuel flow meter (FFM), one or several thrust reverser actuator system (TRAS), an debris monitoring sensor (DMS) in the oil circuit, a pressure sub-system (PSS), an engine anti-ice (EAI) system, or an main heat exchanger (MHX).

Figures 2, 3:
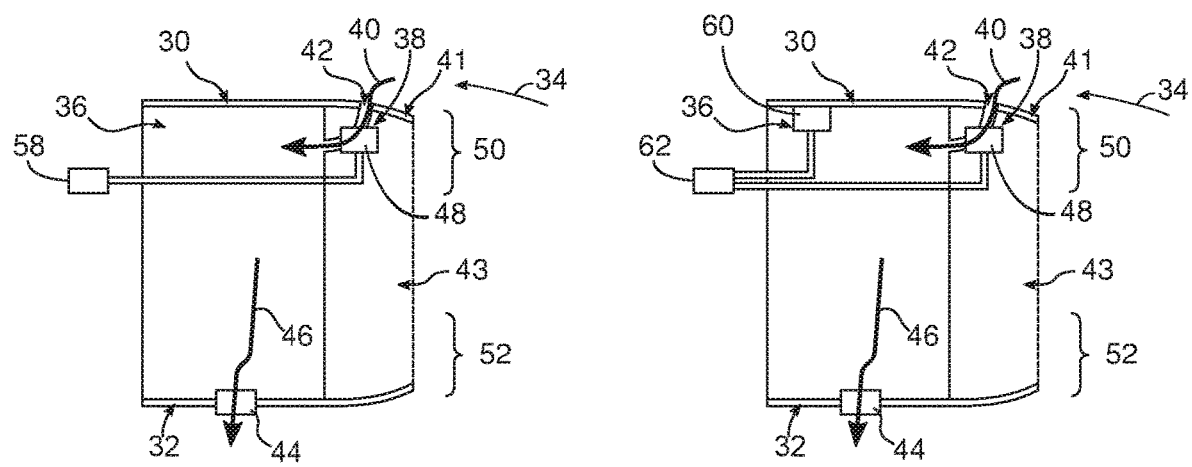
FIGS. 2 to 4 are schematic cross-section views of a part of an aircraft propulsion unit according to the embodiments of the present disclosure.
Figure 4:
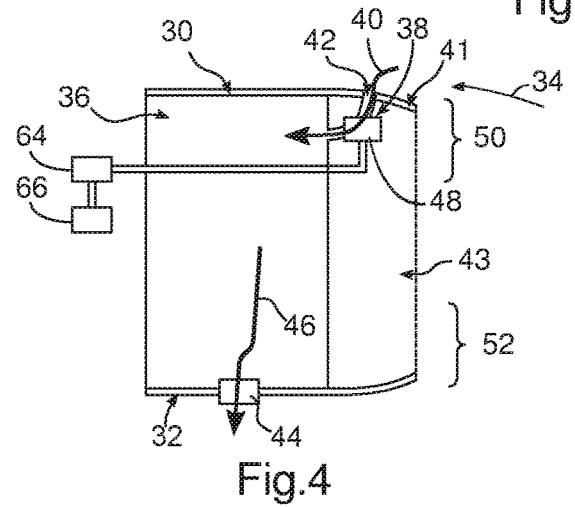

FIGS. 2 to 4 show a portion of the compartment 36 of the propulsion unit 10 of FIG. 1. In FIGS. 2 to 4, the direction of the primary and secondary flows is inverted with respect to FIG. 1, the direction of the secondary air flow being represented by the arrow 34.

The propulsion unit 10 comprises air inlet means 38, shown in FIGS. 2 to 4, arranged so a ventilation air flow penetrates inside the compartment 36. For example, the ventilation air coming into the compartment 36 is represented by the arrow 40. The air inlet means 38 may be positioned in a top part 50 of the compartment 36.

Preferably, the casing 30 of the fan comprises the air inlet means 38. In particular, as shown in FIGS. 2 to 4, the air inlet means 38 are arranged so one end of said air inlet means 38 opens onto an outer surface of the casing 30 of the fan, i.e., towards the ambient air, for example in the secondary air flow, and so another end of said air inlet means 38 opens onto an inner surface of the casing 30 of the fan, i.e., inside the compartment 36. Air coming from the secondary flow may thus be directed to the compartment 36. In some embodiments, the nacelle 32 may comprise the air inlet means 38.

The air inlet means 38 may be arranged on any angular sector of the compartment 36 around the axis 28.

The propulsion unit 10 comprises air outlet means 44 arranged so a ventilation air flow is evacuated from the compartment 36. For example, the ventilation air exiting from the compartment 36 and evacuated outwards is represented by the arrow 46. The air outlet means 40 may be arranged in a bottom part 52 of the compartment 36.

In some embodiments, the nacelle 32 may include the air outlet means 44. For example, as shown in FIGS. 2 to 4, the air outlet means 40 may be arranged so one end of said air outlet means 40 opens onto an inner surface of the nacelle 32, i.e., inside the compartment 36, and so another end of said air outlet means 40 opens onto an outer surface of the nacelle 32, i.e., towards the ambient air. In some embodiments, the casing 30 of the fan may include the air outlet means 44.

The air outlet means 44 may be arranged on any angular sector of the compartment 36 around the axis 28.

The nacelle 32 may include an air intake 43. In particular, the air flow may be collected from a surface 41 of the air intake 43, as represented by the arrow 40 in FIGS. 2 to 4, and flow into the air inlet means 38 to penetrate inside the compartment 36. The ventilation air circulates in the compartment 36 to cool the equipment housed in the compartment 36. Then, the ventilation air is evacuated from the compartment 36 towards the ambient air through the air outlet means 44.

Figure 5:
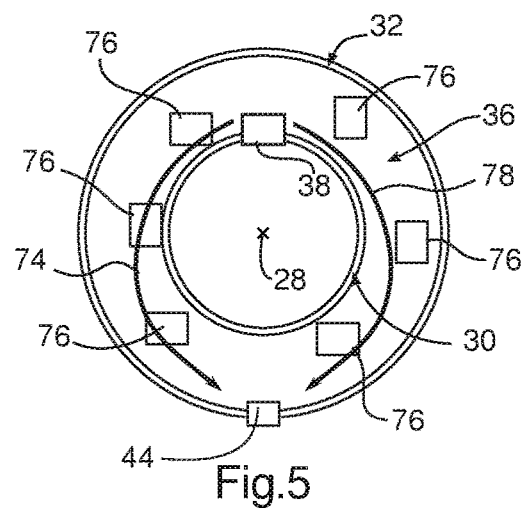
FIG. 5 is a schematic view of the propulsion unit of FIG. 1 along an A-A cross-section.

The compartment 36 being annular in shape, the ventilation air can penetrate inside the compartment 36 and split into two flows, a first flow, represented by the arrow 74 in FIG. 5, cooling a first part of the equipment 76 housed in a first part of the compartment 36 and a second flow, represented by the arrow 78, cooling a second part of the equipment 76 housed in a second part of the compartment 36.

The air inlet means 38 and the air outlet means 44 may be adjacent to each other. The compartment 36 being annular, the ventilation air may penetrate inside the compartment 36, circulate along the annular shape of the compartment 36 to cool all the equipment 76 housed in the compartment 36, i.e., the equipment of the first part of the compartment and the equipment housed in the second part of the compartment, and be evacuated from the compartment 36 towards the ambient air through the air outlet means 44.

The propulsion unit 10 also comprises flow adjustment means 48 configured to maintain a nominal value of the ventilation air flow circulating through at least either the air inlet means 38 or the air outlet means 44 under nominal operating conditions, and to reduce the value of the ventilation air flow when a fire is detected inside the compartment 36. For example, under nominal operating conditions of the propulsion unit 10, the value of the ventilation air flow circulating through the air inlet means 38 and/or the air outlet means 44 is maintained at its nominal value. When a fire is detected in the compartment 36, the value of the ventilation air flow circulating through the air inlet means 38 and/or the air outlet means 44 is reduced with respect to its nominal value.

The flow adjustment means 48 may be configured to interrupt at least either the ventilation air flow entering in the compartment 36 through the air inlet means 38 or the ventilation air flow exiting the compartment 36 through the air outlet means 44 when a fire is detected in the compartment 36. For example, the flow adjustment means 48 may be configured to render negligible the value of the ventilation air flow circulating through at least either the air inlet means 38 or the air outlet means 44 when a fire is detected in the compartment 36.

The nacelle 32 may include the flow adjustment means 48. The casing 30 of the fan may include the flow adjustment means 48.

According to a first embodiment, the flow adjustment means 48 are configured to regulate only the value of the ventilation air flow circulating through the air inlet means 38.

According to a second embodiment, the flow adjustment means 48 are configured to regulate only the value of the ventilation air flow circulating through the air outlet means 44.

In particular, according to these two embodiments, the value of the ventilation air flow circulating through the air inlet means 38, the compartment 36 and the air outlet means 44 is reduced, even when the flow adjustment means 48 are configured to regulate only the value of the ventilation air flow circulating through the air inlet means 38 or the air outlet means 44, as it is the same ventilation air flow that circulates through the air inlet means 38, the compartment 36, and the air outlet means 44.

According to a third embodiment, the flow adjustment means 48 are configured to regulate both the value of the ventilation air flow circulating through the air inlet means 38 and the value of the ventilation air flow circulating through the air outlet means 44. For example, in FIGS. 2 to 4, the flow adjustment means 48 are configured to regulate at least the value of the ventilation air flow circulating through the air inlet means 38.

The air inlet means 38 may include at least one air inlet pipe 42. The air inlet pipe 42 may have a generally cylindrical shape, and feature any shape of section, in particular, circular, oval, or polygonal. The air inlet means 38 may include a plurality of air inlet pipes 42, for example, arranged adjacent to one another or evenly distributed around the axis 28. The flow adjustment means 48 are configured to reduce the air inlet passage section of the air inlet pipe 42.

Figures 6A, 6B:
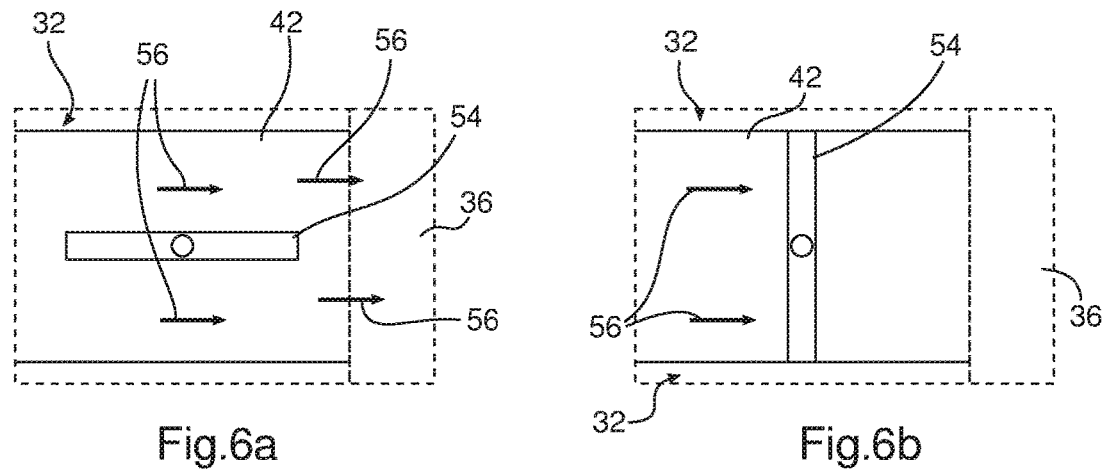
FIGS. 6a and 6b are schematic cross-section views of the flow adjustment means, respectively under nominal operating conditions of the propulsion unit and when a fire is detected in the compartment of the propulsion unit according to an embodiment of the present disclosure.

The flow adjustment means 48 may include a flow-control valve. For example, the flow adjustment means 48 may include a steered butterfly valve, as shown in FIGS. 6a and 6b, or a pressure retaining valve, or any other type of valve that allows control of a ventilation air flow being evacuated from the compartment. In particular, the flow adjustment means 48 comprise a two-position system, with a position in which the ventilation air inlet pipe 42 is open and ventilation air circulates in the pipe 42 to the compartment 36, and a position in which the ventilation air inlet pipe 42 is closed and the ventilation air cannot penetrate inside the compartment 36.

FIG. 6a shows a butterfly valve under nominal operating conditions of the turbine engine. The butterfly valve 54 is open, letting the ventilation air circulate in the air inlet pipe 42 to the compartment 36, the circulation of ventilation air being represented by the arrows 56.

As represented in FIG. 6b showing the butterfly valve when a fire is detected in the compartment 36, the butterfly valve 54 is closed, to reduce, and even prevent, the circulation of ventilation air into the compartment 36, the circulation of ventilation air being represented by the arrow 56. When the butterfly valve closes, it reduces the quantity of ventilation air arriving inside the compartment 36 with respect to FIG. 6a.

The value of the ventilation air flow entering in the air inlet pipe 42 is, if there is a fire in the compartment 36, limited by the flow adjustment means 48. In particular, the flow adjustment means 48 allow completely closing the air inlet pipe 42, for example, when the aircraft pilot performs a turbine engine shutdown procedure in the event of a fire in the compartment 36.

According to one embodiment shown in FIG. 2, the flow adjustment means 48 are adapted to reduce the passage section of the air inlet of the pipe 42 when control means 58 connected to the flow adjustment means 48 are actuated by an aircraft pilot. For example, the reduction of the passage section of the air inlet pipe 42 by the flow adjustment means 48 may be manually triggered by an aircraft pilot when a fire is detected in the compartment 36.

According to one embodiment shown in FIG. 3, the propulsion unit 10 may include at least one temperature sensor 60 configured to measure the temperature in the compartment 36. The temperature sensor 60 may be installed in the top part 50 of the compartment 36, as shown in FIG. 3, or in the bottom part 52 of the compartment 36. The propulsion unit 10 may include a plurality of temperature sensors evenly distributed in the compartment 36. The flow adjustment means 48 are adapted to reduce the passage section of the air inlet of the pipe 42 when the temperature measured by the temperature sensor 60 is equal or superior to a predetermined temperature. The predetermined temperature reflects the presence of fire inside the compartment 36. In other words, the reduction of the passage section of the air inlet pipe 42 by the flow adjustment means 48 may be triggered automatically, for example, by a control system 62 of the aircraft or of the propulsion unit, when a temperature surge is detected in the compartment 36.

According to one embodiment shown in FIG. 4, the flow adjustment means 48 are adapted to reduce the passage section of the air inlet of the pipe 42 when a regulation system 64 is actuated. The regulation system 64 is configured to be actuated when a fire is detected in the compartment 36. The regulation system 64 is adapted to actuate the fuel flow regulation means 66. In particular, when a fire is detected in the compartment 36, the regulation system 64 receives a signal, and sends a signal to various fuel flow regulation means 66, for example, fuel shutoff valves. The regulation system 64 may be configured to, when it receives a signal indicating a fire detected in the compartment 36, trigger the reduction of the air inlet passage section of the pipe 42 with the flow adjustment means 48. In other words, the signal received by the regulation system 64 enables both closing the fuel shutoff valves and reducing the passage section of the air inlet of the pipe 42.

The flow adjustment means 48 may include a fusible link valve. The fusible link valve is configured to be in an open position of the air inlet pipe 42 under nominal operating conditions of the turbine engine. When a fire is detected inside the compartment 36, the fusible link valve switches the air inlet pipe 42 to a close position. The fusible link valve does not comprise a mechanism for reopening the air inlet pipe 42. For example, a maintenance intervention by an operator is required to reopen the fusible link valve, and therefore the air inlet pipe 42. As the maintenance operation is required after the detection of a fire inside the compartment 36, the flow adjustment means 48 comprising a fusible link valve may be simpler and lighter, since the fusible link valve does not include a mechanism for reopening the air inlet pipe 42.

Figure 7:
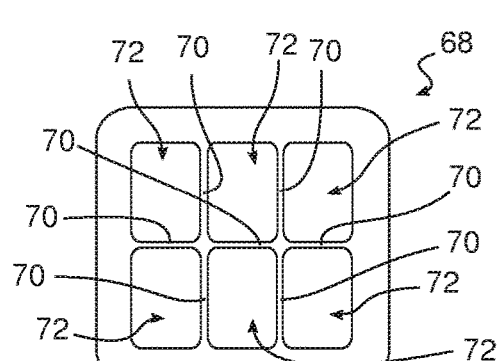
FIG. 7 is a schematic top view of the air outlet means according to one embodiment of the present disclosure.

The air outlet means 44 may include an air outlet grid 68 with fins, in particular shown in FIG. 7. The air outlet means 44 may include a plurality of air outlet grids 68 provided with fins, for example, arranged adjacent to one another or evenly distributed around the axis 28. The air outlet grid 68 comprises fins 70 arranged between orifices 72. The orifices 72 define air outlet passages and can feature any shape of section, in particular circular, oval, polygonal or rectangular with rounded corners, as shown in FIG. 7. In some embodiments, the fins 70 may be oriented to streamline the evacuation of ventilation air exiting the compartment 36 towards the ambient air. The flow adjustment means 48 may be configured to reduce the air outlet passage section through the air outlet grid 68.

According to one embodiment, the fins 70 are made of a thermoplastic material. In the event of a fire inside the compartment 36, the temperature surge of the ventilation air exiting the compartment 36 will heat the thermoplastic material of the fins 70, causing the fins to expand. Thus, the expansion of the fins 70 leads to a partial to full obstruction of the air outlet passages of the air outlet grid 68, which reduces, and in some instances, interrupts, the ventilation flow exiting the compartment 36. The thermoplastic material may be configured so the reduction of the air outlet passage section through the air outlet grid 68 is completed in five minutes or less after the detection of fire in the compartment 36. The fire-extinguishing system, including the quantity of fire-extinguishing agent required to extinguish a fire in the compartment 36, can thus be determined based on the reduced ventilation air flow.

According to another embodiment, the fins 70 comprise an external coating made of an intumescent material, i.e., a material that swells under the effect of heat. For example, the fins 70 may be coated with intumescent paint. Thus, the swelling of the fins 70 leads to a partial to full obstruction of the air outlet passages of the air outlet grid 68, which permits reducing, and even interrupting, the ventilation flow exiting the compartment 36.

Figure 8:
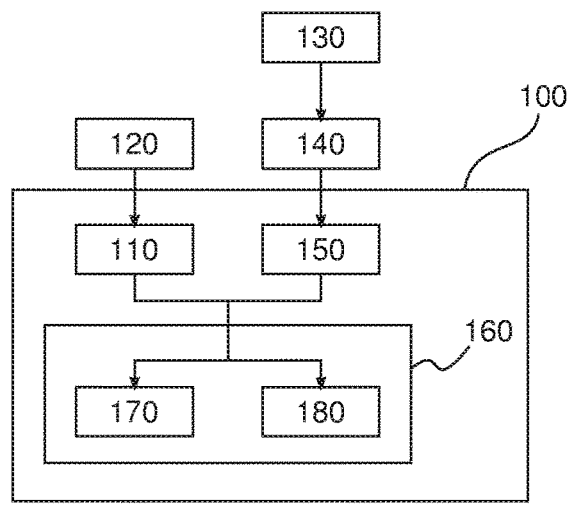
FIG. 8 shows a flow chart of the steps of the process for reducing a ventilation air flow in a compartment of a propulsion unit according to the present disclosure.

The steps of the process for reducing the ventilation air flow of the compartment 36 of the propulsion unit 10 are shown in FIG. 8.

The process comprises a step 100 of adjusting the value of the ventilation air flow circulating through at least one of the air inlet means 38 and of the air outlet means 44 to reduce the value of this ventilation air flow when a fire is detected inside said compartment 36.

The step 100 can comprise a sub-step 110 consisting of reducing the air inlet passage section of the air inlet pipe 42.

According to one embodiment, prior to the sub-step 110, the process may include a step 120 wherein the aircraft pilot actuates control means 58, the control means 58 being connected to the flow adjustment means 48.

According to one embodiment, prior to the sub-step 110, the process may include a step 130 wherein the temperature inside the compartment 36 is measured, and a step 140 wherein the measured temperature is compared with a predetermined temperature. The step 100 may include a sub-step 150 consisting of reducing the air inlet passage section of the air inlet pipe 42 when the measured temperature is equal or superior to the given temperature.

The step 100 may include a sub-step 160 consisting of reducing the section of the air outlet passages through the air outlet grid 68 with fins. In FIG. 8, the sub-step 160 is shown in combination with one of the sub-steps 110 and 150. In alternative embodiments, the sub-step 160 may be an alternative to the sub-steps 110 and 150.

When the fins 70 are made of a thermoplastic material, the sub-step 160 may include a phase 170 whereby the fins 70 expand to reduce the section of the air outlet passages through the air outlet grid 68.

When the fins 70 comprise an external coating of an intumescent material, the sub-step 160 may include a phase 180 whereby the external coating of the fins 70 swells to reduce the section of the air outlet passages through the air outlet grid 68.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft propulsion unit comprising:
   a gas generator including a fan surrounded by a casing;
   a nacelle extending around the casing and defining an annular compartment between the nacelle and the casing, the compartment having an annular shape centered around a longitudinal axis;
   an air inlet arranged on the casing of the fan and configured to accept a ventilation air flow inside the annular compartment;
   an air outlet arranged on the nacelle and configured to evacuate the ventilation air flow from the annular compartment;
   equipment located in the annular compartment between the air inlet and the air outlet; and
   an air flow adjustment regulator configured to maintain a nominal value of the ventilation air flow circulating through at least one of (a) the air inlet or (b) the air outlet under nominal operating conditions, and to reduce a value of the ventilation air flow when a fire is detected inside the annular compartment,
   wherein the air inlet, the air outlet and the longitudinal axis are each aligned with a common plane, and wherein the longitudinal axis is positioned in-between the air inlet and the air outlet.

2. The aircraft propulsion unit according to claim 1, wherein the air inlet includes an air inlet pipe having an air inlet passage section, and the flow adjustment regulator reduces the air inlet passage section of the air inlet pipe.

3. The aircraft propulsion unit according to claim 2, wherein the flow adjustment regulator reduces the section of the air inlet passage of the air inlet pipe when a pilot actuates a control connected to the flow adjustment regulator.

4. The aircraft propulsion unit according to claim 2, further comprising a temperature sensor configured to measure a temperature in the annular compartment, and wherein the flow adjustment regulator reduces the section of the air inlet passage of the air inlet pipe when the temperature measured by the temperature sensor is at least one of (a) greater than a predetermined temperature or (b) equal to a predetermined temperature.

5. The aircraft propulsion unit according to claim 2, wherein the flow adjustment regulator reduces the section of the air inlet passage of the air inlet pipe upon receipt of a signal indicative of a fire being detected in the annular compartment.

6. The aircraft propulsion unit according to claim 1, wherein the flow adjustment regulator includes a flow-control valve.

7. The aircraft propulsion unit according to claim 6, wherein the flow-control valve is one of (a) a butterfly valve or (b) a fusible link valve.

8. The aircraft propulsion unit according to claim 1, wherein the air outlet includes an air outlet grid with fins, and the air flow adjustment regulator configured to reduce a section of the air outlet through the air outlet grid.

9. The aircraft propulsion unit according to claim 8, wherein the fins comprise one of (a) a thermoplastic material or (b) an external coating of an intumescent material.

10. An aircraft comprising at least one aircraft propulsion unit according to claim 1.

11. A process for reducing the ventilation air flow of the annular compartment of the aircraft propulsion unit of the aircraft propulsion unit according to claim 1, the process comprising a step of adjusting a value of the ventilation air flow circulating through at least one of (a) the air inlet or (b) of the air outlet to reduce the value of the ventilation air flow when the fire is detected inside the annular compartment.

12. The aircraft propulsion unit according to claim 1, wherein a first end of the air inlet opens onto an outer surface of the casing of the fan and a second end of the air inlet opens onto an inner surface of the casing of the fan inside the annular compartment.

13. The aircraft propulsion unit according to claim 1, wherein the air outlet is arranged in a bottom part of the annular compartment.

14. The aircraft propulsion unit according to claim 1, wherein the air outlet is arranged so that a first end of said air outlet opens onto an inner surface of the nacelle inside the annular compartment and a second end of said air outlet opens onto an outer surface of the nacelle.

15. The aircraft propulsion unit according to claim 1, wherein the common plane is a vertical plane, and wherein the air inlet is disposed above the air outlet.

16. An aircraft propulsion unit comprising:
a gas generator including a fan surrounded by a casing;
a nacelle extending around the casing and defining a compartment between the nacelle and the casing, the compartment having an annular shape centered around a longitudinal axis;
an air inlet arranged on the casing of the fan and configured to accept a ventilation air flow inside the annular compartment;
an air outlet arranged on the nacelle and configured to evacuate the ventilation air flow from the annular compartment;
equipment located in the annular compartment between the air inlet and the air outlet; and
an air flow adjustment regulator configured to maintain a nominal value of the ventilation air flow circulating through at least the air inlet under nominal operating conditions, and to reduce a value of the ventilation air flow through the air inlet when a fire is detected inside the annular compartment,
wherein the air inlet, the air outlet and the longitudinal axis are each aligned with a common plane, and wherein the longitudinal axis is positioned in-between the air inlet and the air outlet.

17. The aircraft propulsion unit according to claim 16, wherein the air flow adjustment regulator is disposed in the air inlet so as to interrupt at least some of the ventilation air flow through the air inlet.

18. The aircraft propulsion unit according to claim 16, wherein a first end of the air inlet opens onto an outer surface of the casing of the fan and a second end of the air inlet opens onto an inner surface of the casing of the fan inside the annular compartment.

19. The aircraft propulsion unit according to claim 16, wherein the air outlet is arranged in a bottom part of the annular compartment.

20. The aircraft propulsion unit according to claim 16, wherein the air outlet is arranged so that a first end of said air outlet opens onto an inner surface of the nacelle inside the annular compartment and a second end of said air outlet opens onto an outer surface of the nacelle.

21. An aircraft propulsion unit comprising:
a gas generator including a fan surrounded by a casing;
a nacelle extending around the casing and defining a compartment between the nacelle and the casing, the compartment having an annular shape centered around a longitudinal axis;
an air inlet arranged on the casing of the fan and configured to accept a ventilation air flow inside the annular compartment;
an air outlet arranged on the nacelle and configured to evacuate the ventilation air flow from the annular compartment;
equipment located in the annular compartment between the air inlet and the air outlet; and
an air flow adjustment regulator configured to maintain a nominal value of the ventilation air flow circulating through at least the air outlet under nominal operating conditions, and to reduce a value of the ventilation air flow through the air outlet when a fire is detected inside the annular compartment,
wherein the air inlet, the air outlet and the longitudinal axis are each aligned with a common plane, and wherein the longitudinal axis is positioned in-between the air inlet and the air outlet.

* * * * *